United States Patent
Weisberger et al.

[11] Patent Number: 5,807,599
[45] Date of Patent: Sep. 15, 1998

[54] METHOD OF MAKING A DOUGH PRODUCT USING FLEXIBLE COOKING MEMBER AND PRODUCT THEREFROM

[76] Inventors: Joshua Weisberger, 225 Marine Ter., Hillside, N.J. 07205; Peter J. Wilk, 185 W. End Ave., New York, N.Y. 10023

[21] Appl. No.: 779,243

[22] Filed: Jan. 3, 1997

[51] Int. Cl.⁶ .................................................. A23P 1/10
[52] U.S. Cl. .................... 426/279; 426/138; 426/280; 426/282; 426/283; 426/284; 426/512; 426/514; 426/549
[58] Field of Search .................... 426/138, 139, 426/280, 282, 283, 284, 549, 512, 514, 279

[56] References Cited

U.S. PATENT DOCUMENTS

| | | | |
|---|---|---|---|
| 1,589,850 | 6/1926 | Haskell | 426/138 |
| 2,018,950 | 10/1935 | Couture | 42/514 X |
| 2,810,338 | 10/1957 | Dawson | 426/138 X |
| 3,290,154 | 12/1966 | Turner | 426/138 X |
| 3,341,167 | 9/1967 | Weiss | 426/138 X |
| 3,410,691 | 11/1968 | Stanley | 426/283 X |
| 4,009,859 | 3/1977 | Bangert | 426/138 X |
| 4,065,581 | 12/1977 | Heiderpriem | 426/138 |
| 4,214,517 | 7/1980 | Caldwell | 426/138 X |
| 5,000,084 | 3/1991 | Walliker | 426/279 X |
| 5,223,286 | 6/1993 | Selbak | 426/139 X |
| 5,514,395 | 5/1996 | Burger | 426/94 |
| 5,641,527 | 6/1997 | Burger | 426/94 |
| 5,654,021 | 8/1997 | Burger | 426/94 |

*Primary Examiner*—Milton Cano
*Attorney, Agent, or Firm*—R. Neil Sudol; Henry D. Coleman

[57] ABSTRACT

A method for making a food product utilizes an aliquot of dough disposed in a predetermined shape about a cooking member made of a material which has a chemical composition essentially impervious to cooking temperatures. The dough is cooked, e.g., boiled or baked, at a predetermined temperature for a predetermined period. The cooking member is maintained in the dough during the cooking thereof. After the cooking of the dough at the predetermined temperature for the predetermined period, the cooking member is removed from the cooked dough, thereby creating a chamber in the cooked dough.

20 Claims, 1 Drawing Sheet

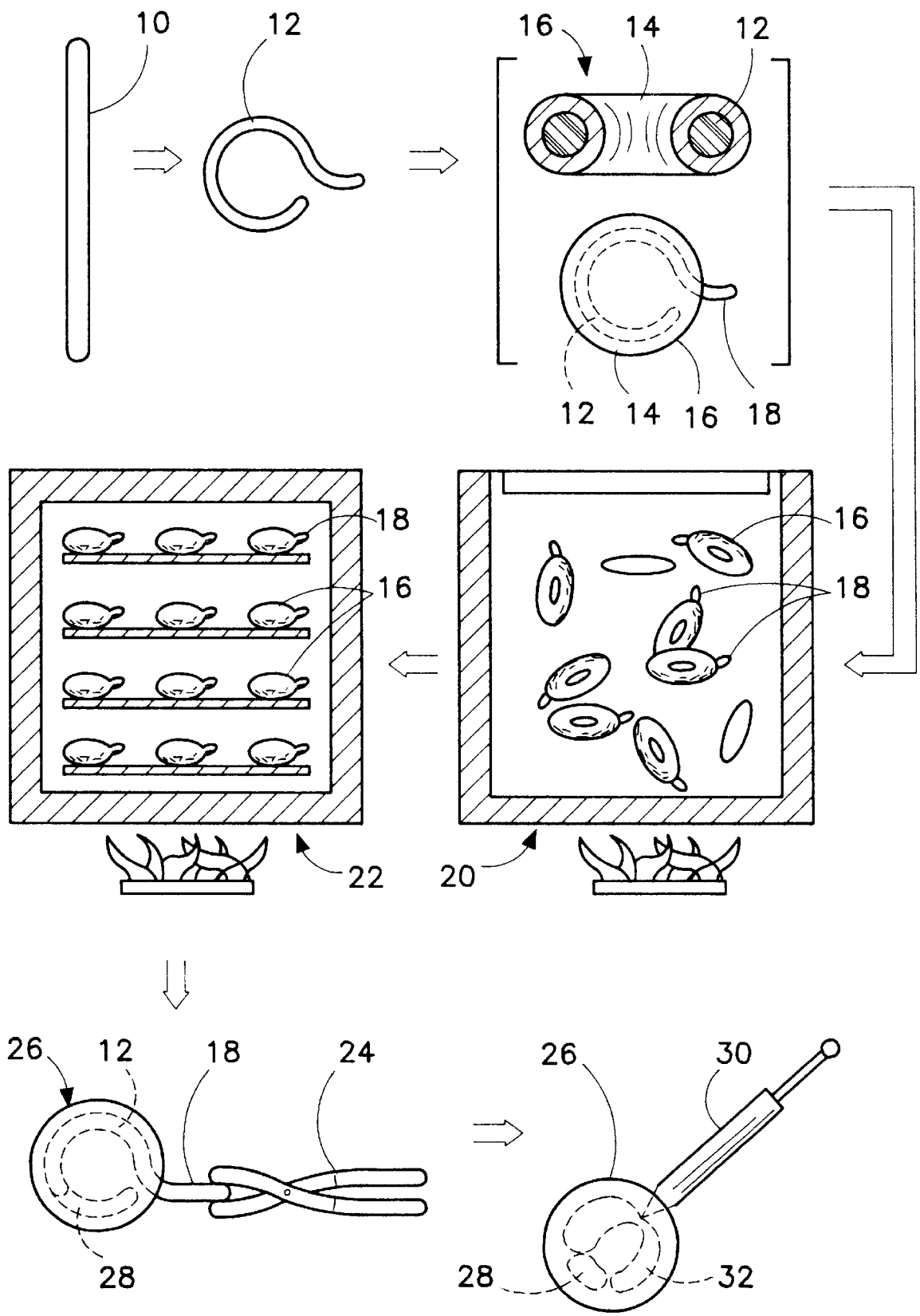

METHOD OF MAKING A DOUGH PRODUCT USING FLEXIBLE COOKING MEMBER AND PRODUCT THEREFROM

BACKGROUND OF THE INVENTION

This invention relates to a cooking method. This invention also relates to a dough preform utilizable in the cooking method. More specifically, this invention relates to a method for making a baked dough product and to an associated preform utilizable in the baking method.

The tastiest parts of certain baked food products such as muffins and bagels are those which are browned owing to exposure to an oven's convection currents. In eating muffins, people frequently separate the crowns from the bodies of the muffins in order to savor the enhanced flavor of the crowns. Likewise, in eating bagels, some people characteristically remove the inner, doughy parts of the bagel and eat only the shell, either alone or with filling such as a cream cheese and scallion spread or a salmon spread. Where a bagel is used to make a sandwich type food item, the hollowing out of the bagel provides the additional advantage of reducing the amount of filling that is squeezed out from between the bagel halves when the consumer bites into the bagel. Concomitantly, a hollow bagel is able to accommodate a greater amount of filling material.

A problem with the conventional manual method of removing dough from the interior of a bagel is inconvenience to the consumer. Another problem is waste that occurs when the removed interior dough is discarded rather than eaten.

Although certain food products such as doughnuts are frequently made with hollow interiors, into which a cream or fruit filling may be deposited, the method by which that hollow interior is formed is not applicable to bagels. Doughnuts can be made from a dough which separates during deep frying to produce an interior chamber. Bagels are cooked by an initial boiling step and a subsequent baking step. Bagels with hollow interiors will not naturally form during the step-step cooking process.

OBJECTS OF THE INVENTION

An object of the present invention is to provide a method of cooking or baking a food product so that the food product has a hollow interior.

Another object of the present invention is to provide such a method which is applicable to a bagel.

An additional object of the present invention is to provide a method of manufacturing a food product which is provided with a filling.

These and other objects of the present invention will be apparent from the descriptions and illustrations herein.

SUMMARY OF THE INVENTION

A method for making a food product utilizes, in accordance with the present invention, an aliquot of dough disposed in a predetermined shape about a cooking member made of a material which has a chemical composition essentially impervious to cooking temperatures. The dough is cooked, e.g., boiled or baked, at a predetermined temperature for a predetermined period. The cooking member is maintained in the dough during the cooking thereof After the cooking of the dough at the predetermined temperature for the predetermined period, the cooking member is removed from the cooked dough, thereby creating a chamber in the cooked dough.

Generally, the dough is molded about the cooking member to form the predetermined dough shape about the cooking member. Alternatively, the cooking member may be inserted or pressed into a lump of the dough.

Pursuant to a feature of the present invention, the cooking member is an elongate member made of a flexible material such as silicone. In that case, the elongate member may be bent to assume a desired form such as a circle. The dough generally conforms to the bent cooking member. The dough has a toroidal shape when the cooking member is bent into a circle.

Preferably, the material of the elongate member is a low-friction material. An end of the elongate member is left protruding from the uncooked dough form. After the dough is cooked, the elongate member is removed from the dough by grasping the protruding end of the elongate member and pulling the elongate member from the cooked dough.

An edible filling may be injected or otherwise deposited into the chamber of the hollow dough cooked product after the pulling of the elongate member from the cooked dough.

A composite dough preform comprises, in accordance with the present invention, an aliquot of dough disposed in a predetermined shape about a cooking member made of a material such as silicone which has a chemical composition essentially impervious to cooking temperatures.

The predetermined shape of the dough and the cooking member may be elongate. More particularly, the cooking member may take the form of a rod. Preferably, the rod is flexible so that it may be bent into an arcuate form such as a circle for cooking a toroidal product such as a bagel.

Preferably, an end of the cooking member protrudes from the dough preform so that cooking member may be grasped and pulled from the cooked dough to generate a hollowed out chamber therein at the end of the cooking operation. To that end, the cooking member is preferably made of a low-friction material.

BRIEF DESCRIPTION OF THE DRAWING

The sole FIGURE of the drawing is a diagram of successive steps in a method for making a bagel in accordance with the present invention.

DESCRIPTION OF THE PREFERRED EMBODIMENTS

An elongate cooking member 10 for use in baking a hollow cooked food product such as a bagel is made of a flexible low-friction material which is impervious to boiling and baking temperatures. Such a material is silicone with a durometer hardness measurement of less than 30.

Cooking member 10 is bent into an arcuate, specifically a circular, form 12. Then a predetermined aliquot of bagel dough 14 is molded about the circularly bent cooking member 12 to produce a toroidal dough preform 16 in which the cooking member 12 is embedded. An end portion 18 of cooking member 10 protrudes from preform 16.

Preform 16 including circularly bent cooking member 12 is now ready for cooking by traditional steps of boiling, schematically represented at 20, and baking, schematically represented at 22. After the bagel preform has been baked, protruding end portion 18 is grasped, e.g., by a pliers 24 and pulled from the baked food item 26 to generate a hollow chamber 28.

Subsequently, a syringe 30 or other instrument may be used to inject or otherwise deposit a filling material 32 such as cream cheese or minced meat into chamber 28. An alternative filling instrument (not illustrated) would have an elongate flexible tube which is inserted into chamber 28 and withdrawn as filling material is fed through the tube to an opening at a free end thereof Although the invention has been described in terms of particular embodiments and applications, one of ordinary skill in the art, in light of this teaching, can generate additional embodiments and modifications without departing from the spirit of or exceeding the scope of the claimed invention. For example, preform 16 may take a form other than toroidal. A food product produced from the preform may be elongate.

The use of a cooking member as described herein may be used to produce hollow food products other than bagels, such as muffins and doughnuts. Also, preform 16 with a straight or bent cooking member 12 may be produced at a first, central, location such as a factory and shipped to remote locations (bakeries) for cooking.

It is generally contemplated that cooking element 10 has a predetermined substantially constant size. However, if a suitable material is available, it would be possible to make the cooking member as an inflatable balloon member. In that event, heating of the balloon and the gases (air) inside it during the cooking process will expand the balloon member further, if only relatively incrementally.

Accordingly, it is to be understood that the drawings and descriptions herein are proffered by way of example to facilitate comprehension of the invention and should not be construed to limit the scope thereof.

What is claimed is:

1. A method for making a food product, comprising the steps of:
   providing an aliquot of dough disposed in a predetermined shape about an elongate cooking member made of a flexible material which has a chemical composition substantially impervious to cooking temperatures, said cooking member being reversibly bent into an arcuate or curved form;
   cooking said dough at a predetermined temperature for a predetermined period;
   maintaining said cooking member in said dough during the cooking thereof; and
   after the cooking of said dough at said predetermined temperature for said predetermined period, removing said cooking member from the cooked dough by shifting at least a portion of said cooking member along an arcuate path defined by the cooking member in the cooked dough, thereby creating an arcuate empty chamber in the cooked dough.

2. The method defined in claim 1 wherein the step of cooking of said dough includes baking said dough.

3. The method defined in claim 2, further comprising the step of molding said dough about said cooking member to form said predetermined shape about said cooking member.

4. The method defined in claim 3, further comprising the step of bending said cooking member substantially into a circle, said predetermined shape being toroidal.

5. The method defined in claim 4 wherein the material of said cooking member is a low-friction material, further comprising the steps of leaving an end of said cooking member protruding from the predetermined shape of the dough, removing said cooking member from the cooked dough including grasping the protruding end of said cooking member and pulling said cooking member from the cooked dough.

6. The method defined in claim 5, further comprising the step of depositing an edible filling into said chamber after the step of pulling of said cooking member from the cooked dough.

7. The method defined in claim 6 wherein the step of depositing of said edible filling includes injecting said filling into said chamber.

8. The method defined in claim 1, further comprising the step of molding said dough about said cooking member to form said predetermined shape about said cooking member.

9. The method defined in claim 1, further comprising the step of bending said cooking member into said arcuate form, providing said aliquot of dough in said predetermined shape about said cooking member including the step of forming the uncooked dough about the arcuate form of said cooking member.

10. The method defined in claim 1 wherein the material of said cooking member is a low-friction material, an end of said cooking member protruding from the predetermined shape of the dough, further comprises the step of removing of said cooking member from the cooked dough including grasping the protruding end of said cooking member and pulling said cooking member from the cooked dough.

11. The method defined in claim 1, further comprising the step of depositing an edible filling into said chamber after the step of pulling of said cooking member from the cooked dough.

12. The method defined in claim 11 wherein the step of depositing of said edible filling includes injecting said filling into said chamber.

13. The method defined in claim 1 wherein the step of removing of said cooking member includes straightening said cooking member as said cooking member is removed from the cooked dough.

14. The method defined in claim 13 wherein the material of said cooking member is a low-friction material, further comprising the steps of leaving an end of said cooking member protruding from the predetermined shape of the dough, removing said cooking member from the cooked dough including grasping the protruding end of said cooking member and pulling said cooking member from the cooked dough.

15. The method defined in claim 1 wherein said cooking member is curved along its length to form an at least partially toroidal configuration in said arcuate or curved form.

16. A composite dough preform comprising an aliquot of dough disposed in a predetermined shape about an elongate cooking member made of a flexible material which has a chemical composition substantially impervious to cooking temperatures, said cooking member being reversibly bent into an at least partially toroidal form.

17. The preform defined in claim 16 wherein the material of said cooking member is a low-friction material and wherein an end of said cooking member protrudes from the predetermined shape of the dough.

18. A method for making a food product, comprising the steps of:
   providing a cooked aliquot of dough disposed in a predetermined shape about an elongate cavity forming member disposed in an arcuate or curved configuration;
   pulling said cavity forming member from the cooked dough through an aperture in the dough, thereby creating a substantially closed arcuate or curved chamber in the cooked dough, the pulling of said cavity forming member including shifting at least a portion of said cavity forming member along an arcuate or curved path defined by said configuration; and
   at least partially straightening said cavity forming member during the pulling of said cavity forming member from the cooked dough.

19. The method defined in claim 18, further comprising the step of depositing an edible filling into said chamber after the step of pulling of said cavity forming member from the cooked dough.

20. The method defined in claim 18, further comprising the step of disposing said dough about said cavity forming member and thereafter cooking said dough while maintaining said cavity forming member at least partially in said dough.

\* \* \* \* \*